United States Patent
Nagar et al.

(10) Patent No.: US 11,928,346 B2
(45) Date of Patent: Mar. 12, 2024

(54) STORAGE OPTIMIZATION BASED ON REFERENCES

(71) Applicant: International Business Machines Corporation, Armonk, NY (US)

(72) Inventors: Raghuveer Prasad Nagar, Kota (IN); Harshit Sharma, Hathras (IN); Jagadesh Ramaswamy Hulugundi, Bangalore (IN); Gaurav Mahesh Pandit, Puntamba (IN)

(73) Assignee: International Business Machines Corporation, Armonk, NY (US)

( * ) Notice: Subject to any disclaimer, the term of this patent is extended or adjusted under 35 U.S.C. 154(b) by 297 days.

(21) Appl. No.: 17/494,480

(22) Filed: Oct. 5, 2021

(65) Prior Publication Data
US 2023/0105471 A1  Apr. 6, 2023

(51) Int. Cl.
*G06F 16/90* (2019.01)
*G06F 3/06* (2006.01)
*G06F 16/955* (2019.01)

(52) U.S. Cl.
CPC .......... *G06F 3/0632* (2013.01); *G06F 3/0604* (2013.01); *G06F 3/0659* (2013.01); *G06F 3/0673* (2013.01); *G06F 16/9566* (2019.01)

(58) Field of Classification Search
CPC .................................................. G06F 16/9566
See application file for complete search history.

(56) References Cited

U.S. PATENT DOCUMENTS

| | | | |
|---|---|---|---|
| 8,935,473 B2 | 1/2015 | Weizman | |
| 9,432,457 B2 | 8/2016 | Marano | |
| 9,552,368 B1* | 1/2017 | Clark | G06F 16/182 |
| 9,569,476 B2* | 2/2017 | Dejana | G06F 3/0665 |
| 9,747,030 B2* | 8/2017 | Morley | G06F 3/0604 |
| 10,250,686 B2 | 4/2019 | McShane | |
| 2004/0250009 A1 | 12/2004 | Chen | |
| 2016/0226972 A1 | 8/2016 | Mahankali | |
| 2022/0107974 A1* | 4/2022 | Kumar | G06N 20/00 |

FOREIGN PATENT DOCUMENTS

CN   202634484 U   12/2012

OTHER PUBLICATIONS

"Data Deduplication—Getting Smarter with AI", Sisense, downloaded from the internet on Jun. 9, 2021, 7 pages, <https://www.sisense.com/whitepapers/data-deduplication-getting-smarter-with-ai/>.

(Continued)

*Primary Examiner* — Kristopher Andersen
(74) *Attorney, Agent, or Firm* — Gilbert Harmon, Jr.

(57) ABSTRACT

An approach for optimizing storage on a local storage device. The approach identifies a stored or being stored on a user's local storage device. The approach extracts metadata from the media file. The approach searches the user-associated storage locations for a matching media file based on the metadata. If the approach locates the matching media file, then the approach, using artificial intelligence (AI), predicts if the local device storage should be optimized for the media file, then the approach, using AI, stores a link to the matching media file on the local device storage and removes the media file from the local device storage.

17 Claims, 6 Drawing Sheets

(56) References Cited

OTHER PUBLICATIONS

"Machine learning and AI-powered Data-Deduplication solution case study", BeyondKey, downloaded from the internet on Sep. 29, 2021, 12 pages, <https://www.beyondkey.com/casestudy/de-duplication>.

"Remo Duplicate Photos Remover on the App Store", Apple, downloaded from the internet on Jun. 9, 2021, 3 pages, https://apps.apple.com/us/app/remo-duplicate-photos-remover/id1066797785>.

Dawson, Thomas, "Media Handler for Local Files that Supports Redirects", An IP.com Prior Art Database Technical Disclosure, IP.com No. IPCOM000220030D, IP.com Electronic Publication Date: Jul. 19, 2012, Copyright: 2012, Sony Electronics Inc., 3 pages.

Mell et al., "The NIST Definition of Cloud Computing", Recommendations of the National Institute of Standards and Technology, Special Publication 800-145, Sep. 2011, 7 pages.

\* cited by examiner

STORAGE OPTIMIZATION BASED ON REFERENCES

TECHNICAL FIELD

The present invention relates generally to media storage on devices, and specifically, to optimizing storage on devices based on determining and storing a reference to media on a device.

BACKGROUND

In the digital era, people are more connected with each other, even while relaxing at home. Further, with the availability of economical smartphones devices, high speed network connectivity at reasonable prices and the increasing popularity of social media, a large portion of the population owns a smartphone. Accordingly, sharing information and data in the form of media is just a matter of a few clicks on a smartphone.

Moreover, usage of electronic communication devices has also increased over the last several years. For example, it is common for a user to have a smart phone, a laptop, a smart TV a personal assistant, e.g., Alexa and home security, e.g., a Ring doorbell. It should be noted that, with the advancement and adoption of Internet of Things (IoT), all these devices art smart, have storage and can access other devices as well as the internet.

The associated increase in media sharing and consumption over the social media platform in the last decades has become economically unfriendly based on the limited storage space in devices. As the increase in quality of media files resulted in larger storage requirements, local storage on a smart device began to be depleted before the useful life of the smart device was exhausted.

In general, keeping desired media files stored locally in a smart device not only creates a problem of local storage running out but also increases the storage cost by contributing to the need for additional services such as paid cloud storage e.g., Google Storage or iCloud storage. Such storage service enhancements come at the overhead cost of monthly or yearly subscription fee. Accordingly, additional storage requirement costs undermine the idea of increasing the reach of digital world to everyone and results in a constraint on users to delete many files, even the files that are of high emotional value, to create space for new files. What is needed is a way to smartly reduce the local space utilization for a user, hence the overall storage cost, without deleting media possessed by the user.

BRIEF SUMMARY

According to an embodiment of the present invention, a computer-implemented method for optimizing storage of media files on a device, the computer-implemented method comprising: identifying, by one or more processors, a media file stored on or being stored to local device storage associated with a user; extracting, by the one or more processors, metadata from the media file; searching, by the one or more processors, storage locations associated with the user for a matching media file based on the metadata; determining, by the one or more processors, if the matching media file was located; and responsive to the matching media file being located, executing, by the one or more processors, actions comprising: predicting, by the one or more processors, using artificial intelligence (AI), if the local device storage should be optimized for the media file based on the matching media file; and responsive to predicting the local device storage should be optimized, storing, by the one or more processors, a link to the matching media file on the local device storage and removing the media file from the local device storage.

According to an embodiment of the present invention, a computer program product for optimizing storage of media files on a device, the computer program product comprising: one or more non-transitory computer readable storage media and program instructions stored on the one or more non-transitory computer readable storage media, the program instructions comprising: program instructions to identify a media file stored on or being stored to local device storage associated with a user; program instructions to extract metadata from the media file; program instructions to search storage locations associated with the user for a matching media file based on the metadata; program instructions to determine if the matching media file was located; and responsive to the matching media file being located, program instructions to execute actions comprising: program instructions to predict, using artificial intelligence (AI), if the local device storage should be optimized for the media file based on the matching media file; and responsive to predicting the local device storage should be optimized, program instructions to store a link to the matching media file on the local device storage and removing the media file from the local device storage.

According to an embodiment of the present invention, a computer system for optimizing storage of media files on a device, the computer system comprising: one or more computer processors; one or more non-transitory computer readable storage media; and program instructions stored on the one or more non-transitory computer readable storage media, the program instructions comprising: program instructions to identify a media file stored on or being stored to local device storage associated with a user; program instructions to extract metadata from the media file; program instructions to search storage locations associated with the user for a matching media file based on the metadata; program instructions to determine if the matching media file was located; and responsive to the matching media file being located, program instructions to execute actions comprising: program instructions to predict, using artificial intelligence (AI), if the local device storage should be optimized for the media file based on the matching media file; and responsive to predicting the local device storage should be optimized, program instructions to store a link to the matching media file on the local device storage and removing the media file from the local device storage.

Other aspects and embodiments of the present invention will become apparent from the following detailed description, which, when taken in conjunction with the drawings, illustrate by way of example the principles of the invention.

DETAILED DESCRIPTION

Figure 1:
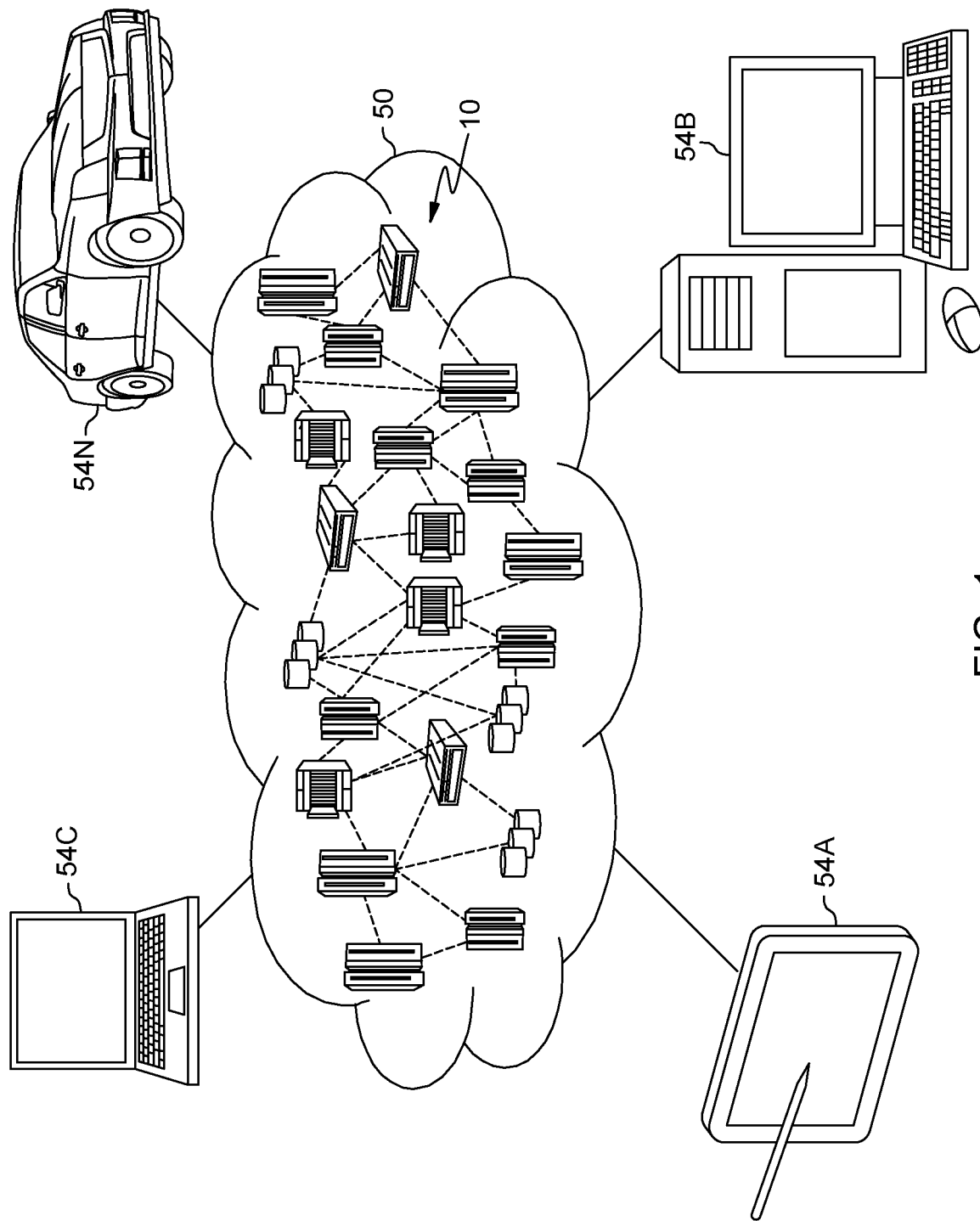
FIG. 1 depicts a cloud computing environment, according to embodiments of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several embodiments of optimizing device storage based on replacing a direct storage of media on a local device with a reference to the media, stored on the local device, and the media stored on another device. It should be noted that the optimizations employed in these embodiments can also result in greater efficiencies for bulk storage services, e.g., cloud services, when multiple subscribers are storing the same media on a cloud storage device.

Embodiments of the present invention can, based on Artificial Intelligence (AI) and an Internet of Things (IoT) based implementation, recursively optimize both the utilization and local storage on smart devices of a user's media storage. Accordingly, user desired media can dynamically be retained with only one or more references to the media stored locally on the smart device while the media remains in locations at known locations available across the internet.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
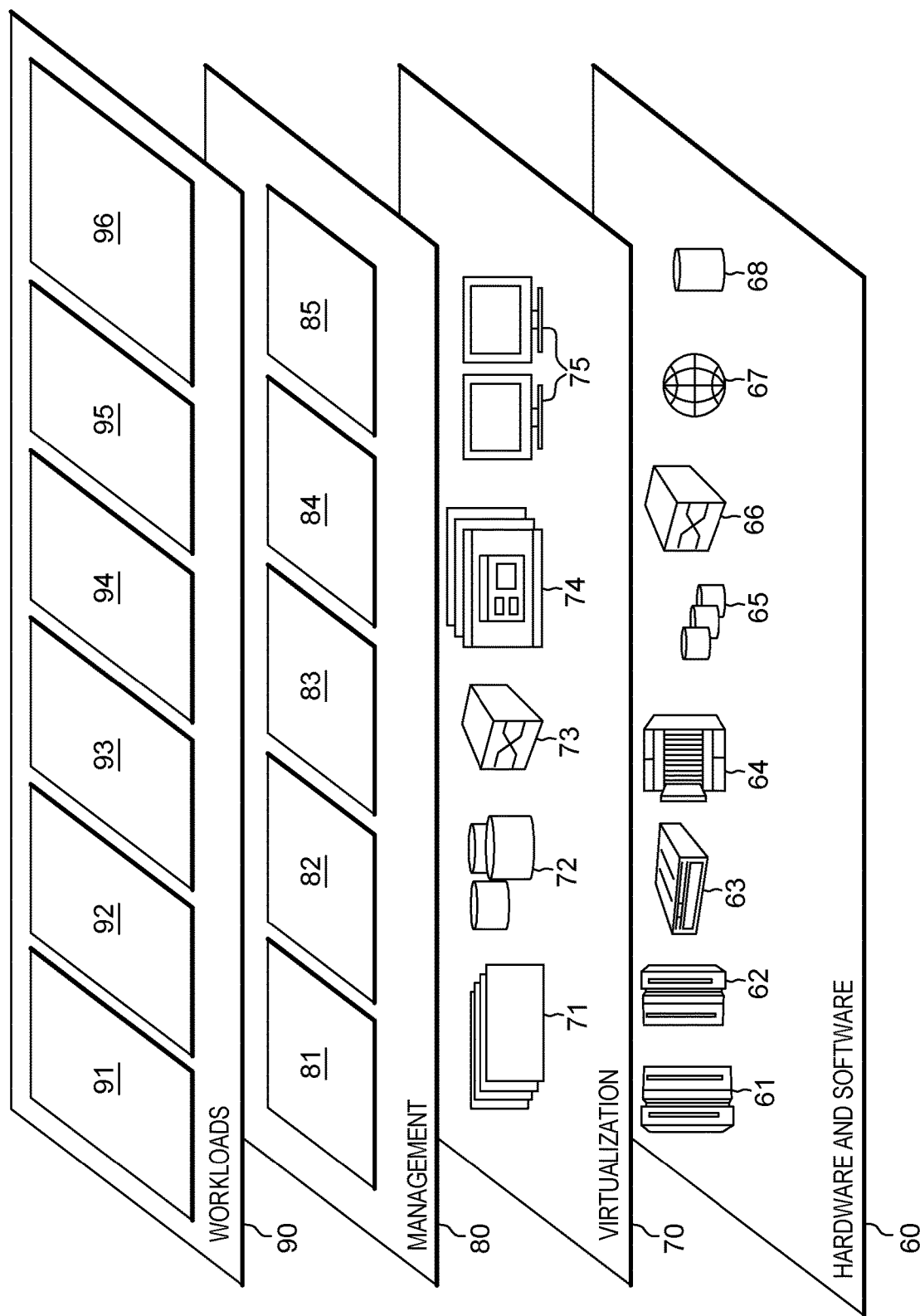
FIG. 2 depicts abstraction model layers, according to embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 include hardware and software components. Examples of hardware components include mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include mapping and navigation 91; software development and lifecycle management 92; virtual classroom education delivery 93; data analytics processing 94; transaction processing 95; and local storage optimization management 96.

It should be noted that the embodiments of the present invention may operate with a user's permission. Any data may be gathered, stored, analyzed, etc., with a user's consent. In various configurations, at least some of the embodiments of the present invention are implemented into an opt-in application, plug-in, etc., as would be understood by one having ordinary skill in the art upon reading the present disclosure.

Figure 3:
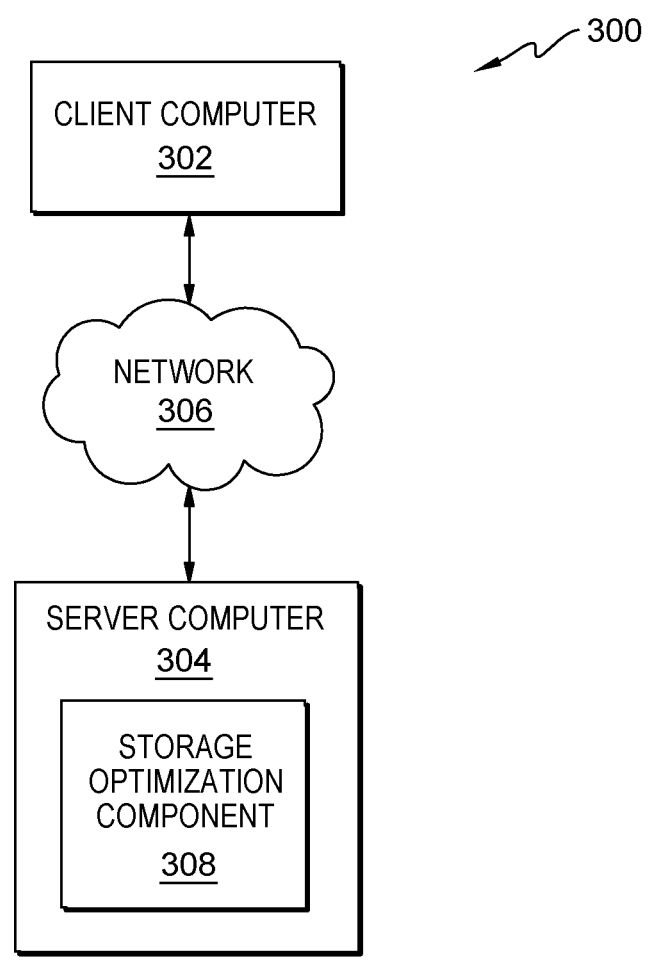
FIG. 3 is a high-level architecture, according to embodiments of the present invention.
Figure 4:
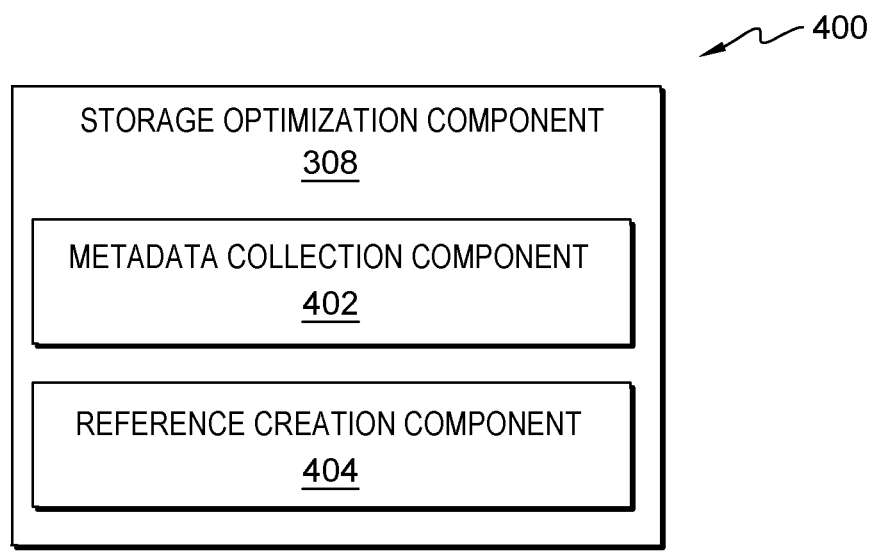
FIG. 4 is an exemplary detailed architecture, according to embodiments of the present invention.
Figure 5:
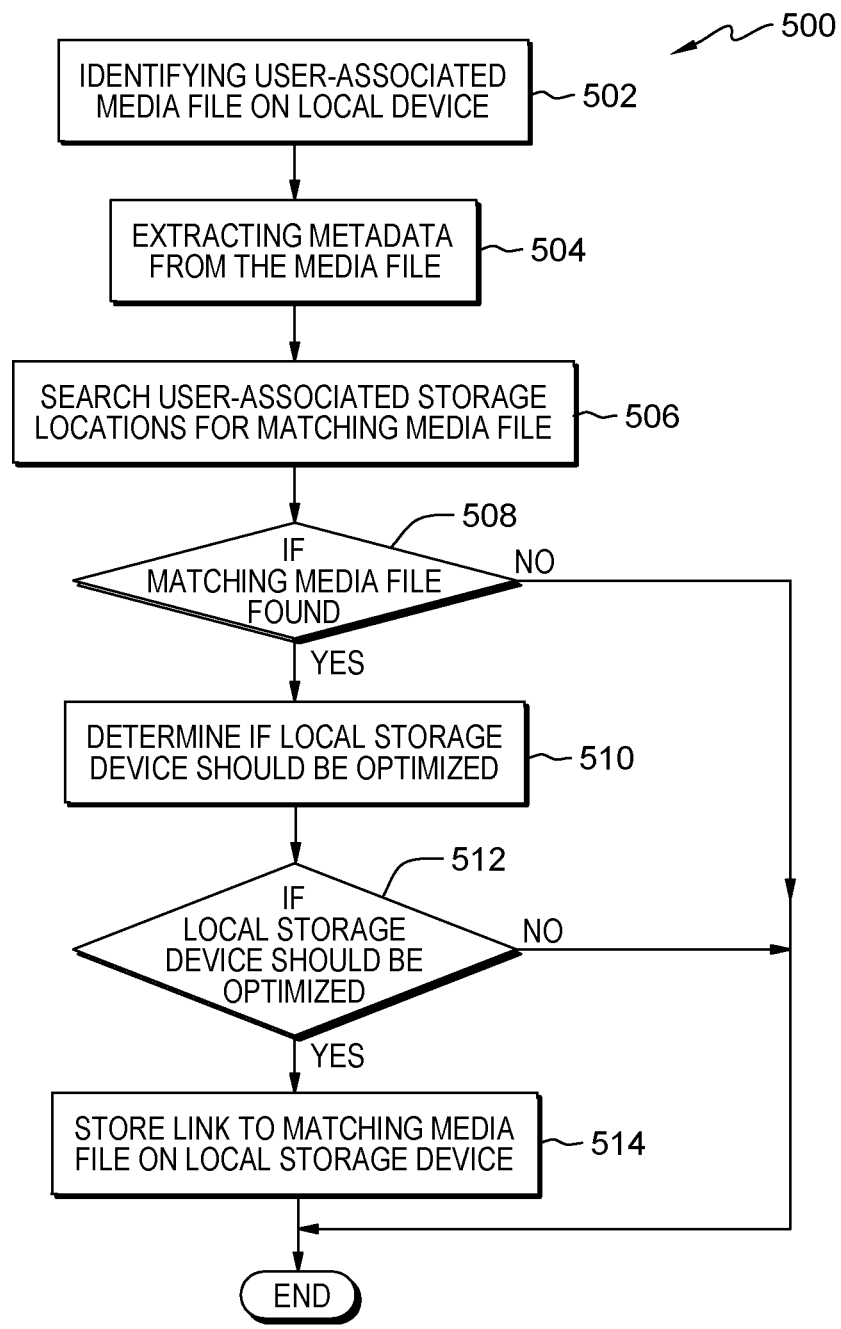
FIG. 5 is a flowchart of a method, according to embodiments of the present invention.

FIG. 3 is a high-level architecture for performing various operations of FIG. 5, in accordance with various embodiments. The architecture 300 may be implemented in accordance with the present invention in any of the environments depicted in FIGS. 1-4, among others, in various embodiments. Of course, more or less elements than those specifically described in FIG. 3 may be included in architecture 300, as would be understood by one of ordinary skill in the art upon reading the present descriptions.

Each of the steps of the method 500 (described in further detail below) may be performed by any suitable component of the architecture 300. A processor, e.g., processing circuit(s), chip(s), and/or module(s) implemented in hardware and/or software, and preferably having at least one hardware component may be utilized in any device to perform one or more steps of the method 500 in the architecture 300. Illustrative processors include, but are not limited to, a central processing unit (CPU), an application specific integrated circuit (ASIC), a field programmable gate array (FPGA), etc., combinations thereof, or any other suitable computing device known in the art.

Architecture 300 includes a block diagram, showing a storage optimization system, to which the invention principles may be applied. The architecture 300 comprises a client computer 302, a storage optimization component 308 operational on a server computer 304 and a network 306 supporting communication between the client computer 302 and the server computer 304.

Client computer 302 can be any computing device on which software is installed for which an update is desired or required. Client computer 302 can be a standalone computing device, management server, a web server, a mobile computing device, or any other electronic device or computing system capable of receiving, sending, and processing data. In other embodiments, client computer 302 can represent a server computing system utilizing multiple computers as a server system. In another embodiment, client computer 302 can be a laptop computer, a tablet computer, a netbook computer, a personal computer, a desktop computer or any programmable electronic device capable of communicating with other computing devices (not shown) within user persona generation environment via network 306.

In another embodiment, client computer 302 represents a computing system utilizing clustered computers and components (e.g., database server computers, application server computers, etc.) that act as a single pool of seamless resources when accessed within install-time validation environment of architecture 300. Client computer 302 can include internal and external hardware components, as depicted and described in further detail with respect to FIG. 5.

Server computer 304 can be a standalone computing device, management server, a web server, a mobile computing device, or any other electronic device or computing system capable of receiving, sending, and processing data. In other embodiments, server computer 304 can represent a server computing system utilizing multiple computers as a server system. In another embodiment, server computer 304 can be a laptop computer, a tablet computer, a netbook computer, a personal computer, a desktop computer, or any programmable electronic device capable of communicating with other computing devices (not shown) within install-time validation environment of architecture 300 via network 306.

Network 306 can be, for example, a local area network (LAN), a wide area network (WAN) such as the Internet, or a combination of the two, and can include wired, wireless, or fiber optic connections. In general, network 306 can be any combination of connections and protocols that will support communications between client computer 302 and server computer 304.

In one embodiment of the present invention, storage optimization component 308, operational on server computer 304, can extract metadata from a media file that a user has downloaded or is downloading. In another aspect of an embodiment of the present invention, storage optimization component 308, can search communicatively connected devices, e.g., accessible cloud storage locations, online digital content platforms, other user devices, devices of trusted contacts, etc., to find the identified media in another location. In another aspect of an embodiment of the present invention, storage optimization component 308, can determine a remote location for storing the media if storage optimization component 308 cannot locate a duplicate of the media. In another aspect of an embodiment of the present invention, storage optimization component 308 can generate a link pointing to the remote storage location and store the link locally on the user's device. It should be noted that if the media is currently on the user's device, it can be removed once the link to the remote location is stored.

FIG. 4 is an exemplary detailed architecture for performing various operations of FIG. 5, in accordance with various embodiments. The architecture 400 may be implemented in accordance with the present invention in any of the environments depicted in FIGS. 1-3 and 5, among others, in various embodiments. Of course, more or less elements than those specifically described in FIG. 4 may be included in architecture 400, as would be understood by one of skill in the art upon reading the present descriptions.

Each of the steps of the method 500 (described in further detail below) may be performed by any suitable component of the architecture 400. A processor, e.g., processing circuit(s), chip(s), and/or module(s) implemented in hardware and/or software, and preferably having at least one hardware component, may be utilized in any device to perform one or more steps of the method 500 in the architecture 400. Illustrative processors include, but are not limited to, a central processing unit (CPU), an application specific integrated circuit (ASIC), a field programmable gate array (FPGA), etc., combinations thereof, or any other suitable computing device known in the art.

Architecture 400 provides a detailed view of at least some of the modules of architecture 300. Architecture 400 can comprise a storage optimization component 308, which can further comprise a metadata collection component 402, and a reference creation component 404.

In one aspect of an embodiment of the present invention, metadata collection component 402 can extract metadata from a media file a user has downloaded or has selected for download. It should be noted that the extracted metadata can include but is not limited to, the name of the media file, the context of file receipt (described subsequently), media file access time information, media file play time information (if applicable), e.g., a media file access time window of a start time and an end time of a portion of a larger media file. Metadata collection component 402 can provide the extracted metadata to reference creation component 404 (described subsequently) for use in deciding whether to store the media file locally or remotely. It should also be noted that a user has provided informed consent for allowing access to media files containing personal information. It should further be noted that the media file can be, but is not limited to, a video file, an audio file, an image file, and a text file.

In another aspect of an embodiment of the present invention, reference creation component 404 can provide the capability to determine if the media file should be stored remotely. If reference creation component 404 can locate the media file already available at a remote location, then reference creation component 404 can base the decision to use the located media file on factors such as, but not limited to, a prediction of the date after which the media file will no longer be of interest to the user, a prediction of the date the located media file would be removed from the remote location and a prediction of the importance, e.g., emotional value, of the media file to the user. It should be noted that reference creation component 404 can search locations such as but not limited to, online digital content platforms, the internet, other user devices (with prior consent), devices of trusted contacts (with prior consent), etc.

In another aspect of an embodiment of the present invention, reference creation component 404 can create a link package to the located media file for storage on the user's local device. The link package can contain, but is not limited to, a uniform resource locator ( )pointing to the located remote media file, a start time and end time if the media file is a video file or an audio file, a frame identifier if the media file is an image, and a section/index identifier if the media file is a text file. It should be noted that the portion of the media file of interest to the user may be a portion of the located media file.

In another aspect of an embodiment of the present invention, if reference creation component 404 cannot locate the media file already available at a remote location, then reference creation component 404 can base the decision to create a remote copy of the media file on factors such as, but not limited to, a prediction of the date after which the media file will no longer be of interest to the user, a prediction of the date until which the target storage location will continue to have the required storage space for the media file, and a prediction of the importance, e.g., emotional value, of the media file to the user. It should be noted that reference creation component 404 can create a storage location for media files on locations such as but not limited to, storage accounts on cloud services, the internet, other user devices (with prior consent), devices of trusted contacts (with prior consent), etc. It should also be noted that once the remote copy of the media file is created, the copy of the media file on the user's local device is replace with a link to the remote copy of the media file.

In another aspect of an embodiment of the present invention, reference creation component 404 can create a link to the remote copy of the media file and store the link on the user's local device. The link can contain, but is not limited to, a uniform resource locator () pointing to the remote copy of the media file.

Considering other embodiments of storage optimization component 308, a user can sign-up for a service offered by the embodiments. It should be noted that a sign-up mechanism is desired because use of the embodiments involves processing of personal data such as, but not limited to, social data and user experience information. In another aspect, a sign-up mechanism can allow a user to declare additional information like remote storage locations and online digital content platform accounts. It should be noted that a sign-up mechanism assures that a user understands the data privacy statements and agreements associated with the use of these service features.

Storage optimization component 308 can have access to a user's file system, internet connection of a user's device, contacts, location, historical preferences of data persistence and archiving. Storage optimization component 308 can also have access to a corpus of existing files on the file system of user's smart device. If required, the corpus of existing files can be identified by storage optimization component 308 as confidential, classified, private or public.

Storage optimization component 308 can maintain a knowledge corpus of user's emotional factor for any digital content based on social media likes/dislikes, number of times of watching a content, pausing and replaying at certain points of content, body language expressions or eye sentiments from webcam of smart devices, e.g., laptop and smart contact lens.

Storage optimization component 308 can be activated based on an event such as but not limited to, user Downloads/stores a file, user's local file system e.g., library, detects new files, etc. It should be noted that new files can be an application specific download, e.g., "WhatsApp" download or a generic download, e.g., music video download from YouTube. In another aspect of an embodiment of storage optimization component 308, a user can intend to download/store a file based on initiating a download. Accordingly, storage optimization component 308 can detect an ongoing/active download or function as a background service, e.g., a time-triggered service.

In another aspect, if storage optimization component 308 detects new digital content being/already downloaded on a smart device, then storage optimization component 308 can recursively store the downloaded content in a transitory buffer. Storage optimization component 308 can extract features/metadata from key frames or image frames and convert speech to text to generate the video search inputs for video files. Storage optimization component 308 can leverage deep learning models, e.g., a Region-based Convolutional Neural Network (R-CNN) for image, video or audio content files or any such unstructured data files.

It should be noted that storage optimization component 308 can employ similar search techniques to search audio, ".pdf," ".doc," ".xls," ".ppt," etc. file formats. Additionally, examples of extracted metadata can include, but are not limited to, name of file, e.g., "Hotel California.mpeg," context of receipt of file, e.g., Sara sending "sharing video of our get together last evening, a moment to cherish" to Jillian over WhatsApp, followed by the video. It should further be noted that Natural Language Processing (NLP) techniques can be used wherein a context is determined based on accessible collaborative platforms like email applications and text messaging applications.

Storage optimization component 308 can use the search input and search for the media file of interest in online digital content platforms accessible to the user, in free or subscription-based access of publicly available data on the Internet, on other user devices, e.g., a user initiated a download on the mobile phone, so a search can be triggered on an associated laptop, smart watch and smart TV, on devices of close contacts, e.g., search on spouse's smart phone. It should be noted that a user can provide configuration information identifying contacts as part of service subscription. Storage optimization component 308 can search local internal storage on the smart device to determine if the same content file already exists. In another aspect of embodiments of the present invention, storage optimization component 308 can utilize cognitive tools such as, but not limited to "Watson Search" by IBM for performing real-time internet searches.

Similarly, storage optimization component 308 can leverage text-based searches for structured content files. Storage optimization component 308 can employ machine learning techniques, e.g., a Linear Regression model, to predict the disk consumption velocity of the user along with the emotional quotient in the context of a media file under consideration and determine the appropriate location for storing the media file. It should be noted that if the media file is located in multiple storage locations then storage optimization component 308 can analyze user's preferred contacts and their smart device demographic patterns and leverage Retrieve and Rank machine learning algorithms to determine the appropriate location for using to create the link for storage on the user local device.

Storage optimization component 308 can make a decision of replacement of a media file based on predicting, using artificial intelligence (AI) comprising machine learning, image recognition and natural language processing, the date after which a locally stored file will not be used by the user. It should be noted that this is based on deep learning and NLP processing of the context of the file, e.g., an image of a shipment tracking receipt has been shared, so it is likely that it will not be required after shipment delivery. Storage optimization component 308 can predict the date by which the searched file will not be removed based on the data available for the searched file, e.g., Expiry/archival date of the searched file. Storage optimization component 308 can also predict the importance, e.g., emotional value, of a locally stored file. It should be noted that this prediction is based on a user profile, social media and IoT data using NLP techniques.

In another aspect of an embodiment of the present invention, storage optimization component 308 can make a decision on storing a media file on an alternative storage location (ASL) (and replacing locally stored file with the link to that storage location) based on predicting the importance, e.g., emotional value, of a locally stored file, predicting the date by which the target storage location will continue to have the required space, based on subscription details associated with the ASL, e.g., online storage subscription ends after 2 years, usage of the ASL device owner, e.g., spouse has 100 GB left whereas average monthly consumption is 100 MB) and predicting the date after which the locally stored media file will not be used by the user.

It should be noted that link information can include, but is not limited to, an URL of the searched file, e.g., URL of a "YouTube" video if the video is shared over Email as an attachment and exists on "YouTube," inclusion details for the media file such as, but not limited to, start time and end time for video/audio media files, e.g., an interlude of a song was shared over "WhatsApp," storage optimization component 308 can share the "YouTube" link of the complete song with the start time and end time of the shared interlude, a frame identifier for an image, a section/index identifier for a text file and the URL of the file stored on the ASL, if the downloaded file has been stored on an ASL.

FIG. 5 is an exemplary flowchart of a method 500 for optimizing local device storage. At step 502, an embodiment can identify, via reference creation component 404, a user-associated media file on a local device. At step 504, the embodiment can extract, via metadata collection component 402, metadata associated with the media file. At step 506, the embodiment can search, via reference creation component 404, storage locations, associated with the user, for a matching media file. At step 508, the embodiment can determine, via reference creation component 404, if a matching media file was found. If a matching media file was found, then the embodiment continues to step 510. If a matching media file was not found, then the embodiment ends. At step 510, the embodiment can determine, via reference creation component 404, if the local storage device should be optimized. At step 512, if the local storage device should be optimized, then the embodiment continues to step 514. If the local storage should not be optimized, then the embodiment ends. At step 514, the embodiment can store, via reference creation component 404, the link to the matching media file on the local storage device.

Figure 6:
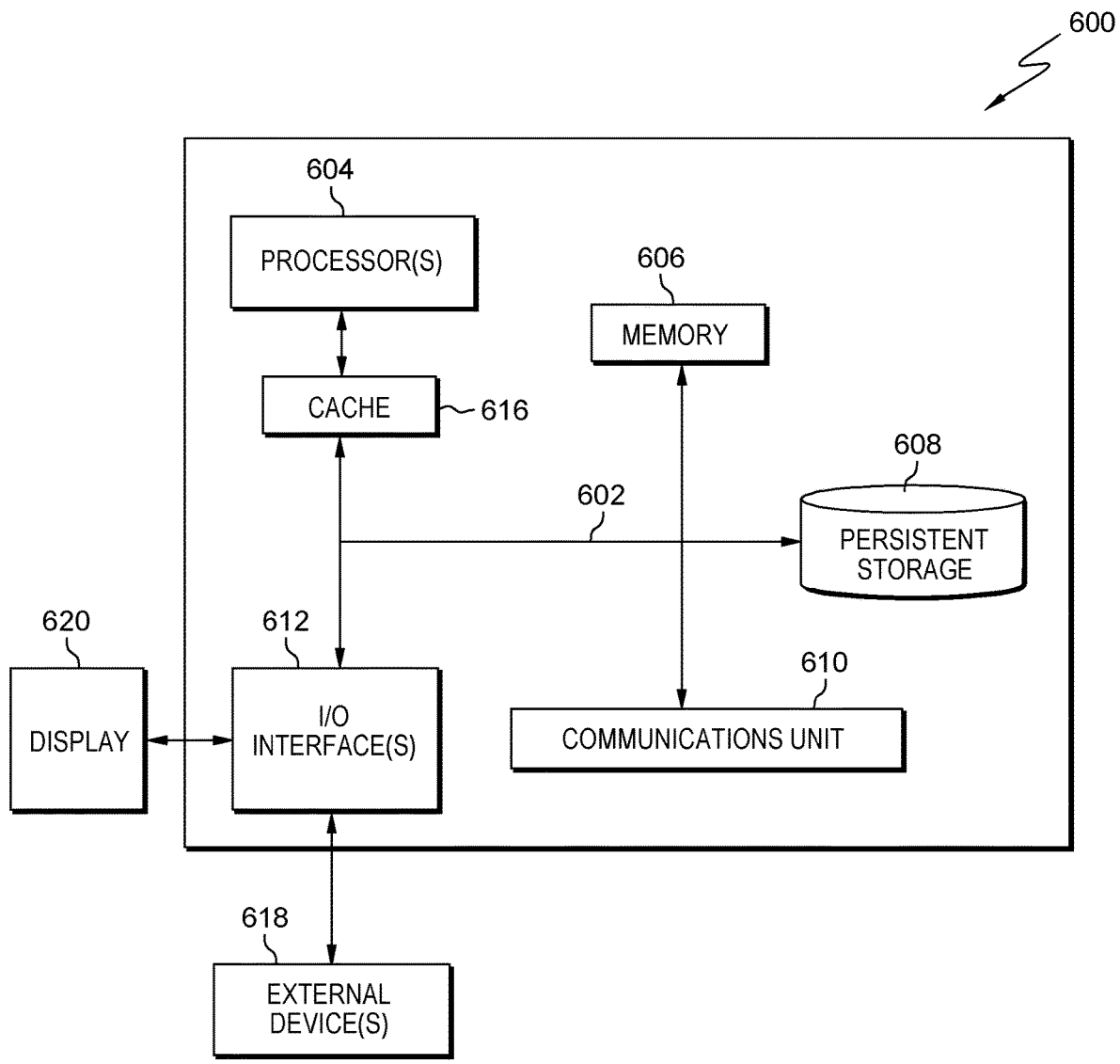
FIG. 6 is a block diagram of internal and external components of a data processing system in which embodiments described herein may be implemented, according to embodiments of the present invention.

FIG. 6 depicts computer system 600, an example computer system representative of client computer 302 and server computer 304. Computer system 600 includes communications fabric 602, which provides communications between computer processor(s) 604, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Computer system 600 includes processors 604, cache 616, memory 606, persistent storage 608, communications unit 610, input/output (I/O) interface(s) 612 and communications fabric 602. Communications fabric 602 provides communications between cache 616, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses or a crossbar switch.

Memory 606 and persistent storage 608 are computer readable storage media. In this embodiment, memory 606 includes random access memory (RAM). In general, memory 606 can include any suitable volatile or non-volatile computer readable storage media. Cache 616 is a fast memory that enhances the performance of processors 604 by holding recently accessed data, and data near recently accessed data, from memory 606.

Program instructions and data used to practice embodiments of the present invention may be stored in persistent storage 608 and in memory 606 for execution by one or more of the respective processors 604 via cache 616. In an embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 610, in these examples, provides for communications with other data processing systems or devices. In these examples, communications unit 610 includes one or more network interface cards. Communications unit 610 may provide communications through the use of either or both physical and wireless communications links. Program instructions and data used to practice embodiments of the present invention may be downloaded to persistent storage 608 through communications unit 610.

I/O interface(s) 612 allows for input and output of data with other devices that may be connected to each computer system. For example, I/O interface 612 may provide a connection to external devices 618 such as a keyboard, keypad, a touch screen, and/or some other suitable input device. External devices 618 can also include portable computer readable storage media such as, for example, thumb drives, portable optical or magnetic disks, and memory cards. Software and data used to practice embodiments of the present invention can be stored on such portable computer readable storage media and can be loaded onto persistent storage 608 via I/O interface(s) 612. I/O interface(s) 612 also connect to display 620.

Display 620 provides a mechanism to display data to a user and may be, for example, a computer monitor.

The components described herein are identified based upon the application for which they are implemented in a specific embodiment of the invention. However, it should be appreciated that any particular component nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for optimizing storage of media files on a device, the computer-implemented method comprising:
    identifying, by one or more processors, a media file stored on or being stored to local device storage associated with a user;
    extracting, by the one or more processors, metadata from the media file;
    searching, by the one or more processors, storage locations associated with the user for a matching media file based on the metadata;
    determining, by the one or more processors, if the matching media file was located; and
    responsive to the matching media file being located, executing, by the one or more processors, actions comprising:
        predicting, by the one or more processors, using artificial intelligence (AI), if the local device storage should be optimized for the media file based on the matching media file; and
        responsive to predicting the local device storage should be optimized, executing, by the one or more processors, actions comprising:
            creating, by the one or more processors, a link package comprising a link to the matching media file;
            storing, by the one or more processors, the link package on the local device storage; and
            removing, by the one or more processors, the media file from the local device storage: and
    responsive to the matching media file not being located, executing, by the one or more processors, actions comprising:
        searching, by the one or more processors, alternative storage locations associated with the user;
        determining, by the one or more processors, if an alternative storage location was located:
        responsive to the alternative storage location being located, predicting, using AI, by the one or more processors, if the local device storage should be optimized for the media file based on the alternative storage location; and
        responsive to predicting the local device storage should be optimized, executing, by the one or more processors, actions comprising:
            storing, by the one or more processors, the media file on the alternative storage location;
            creating, by the one or more processors, a link package comprising a link to the media file on the alternative storage location;
            storing the link package on the local device storage; and
            removing the media file from the local device storage.

2. The computer-implemented method of claim 1, wherein the metadata comprises a name of the media file, a context of the media file receipt and a media file access time window.

3. The computer-implemented method of claim 1, wherein determining if the local device storage should be optimized for the media file, based on the matching media, is based on factors comprising predicting a date after which the media file will not be used by the user, predicting a date until which the matching media file will not be removed and predicting importance of the media file to the user.

4. The computer-implemented method of claim 1, wherein determining if the local device storage should be optimized for the media file, based on the alternative storage location, is based on factors comprising predicting a date after which the media file will not be used by the user, predicting a date until which the alternative storage location will have the required space and predicting importance of the media file to the user.

5. The computer-implemented method of claim 1, wherein the link package further comprises a matching media file start time and end time for audio or video in the media file, matching media file frame identifiers for images in the media file, and matching media file section or text identifiers for text media files.

6. The computer-implemented method of claim 1, wherein the link in the link package is a uniform resource locator (URL) to the media file.

7. A computer program product for optimizing storage of media files on a device, the computer program product comprising:
    one or more non-transitory computer readable storage media and program instructions stored on the one or more non-transitory computer readable storage media, the program instructions comprising:
        program instructions to identify a media file stored on or being stored to local device storage associated with a user;
        program instructions to extract metadata from the media file;
        program instructions to search storage locations associated with the user for a matching media file based on the metadata;
        program instructions to determine if the matching media file was located; and
        responsive to the matching media file being located, program instructions to execute actions comprising:
            program instructions to predict, using artificial intelligence (AI), if the local device storage should be optimized for the media file based on the matching media file; and
            responsive to predicting the local device storage should be optimized, program instructions to execute actions comprising:
                program instructions to create a link package comprising a link to the matching media file;
                program instructions to store the link package file on the local device storage; and
                program instructions to remove the media file from the local device storage: and
        responsive to the matching media file not being located, program instructions to execute actions comprising:

program instructions to search alternative storage locations associated with the user;
program instructions to determine if an alternative storage location was located;
responsive to the alternative storage location being located, program instructions to predict, using AI, if the local device storage should be optimized for the media file based on the alternative storage location; and
responsive to predicting the local device storage should be optimized, program instructions to execute actions comprising:
program instructions to store the media file on the alternative storage location:
program instructions to create a link package comprising a link to the media file on the alternative storage location;
program instructions to store the link package on the local device storage; and
program instructions to remove the media file from the local device storage.

8. The computer program product of claim 7, wherein the metadata comprises a name of the media file, a context of the media file receipt and a media file access time window.

9. The computer program product of claim 7, wherein determining if the local device storage should be optimized for the media file, based on the matching media, is based on factors comprising predicting a date after which the media file will not be used by the user, predicting a date until which the matching media file will not be removed and predicting importance of the media file to the user.

10. The computer program product of claim 7, wherein determining if the local device storage should be optimized for the media file, based on the alternative storage location, is based on factors comprising predicting a date after which the media file will not be used by the user, predicting a date until which the alternative storage location will have the required space and predicting importance of the media file to the user.

11. The computer program product of claim 7, wherein the link package further comprises a matching media file start time and end time for audio or video in the media file, matching media file frame identifiers for images in the media file, and matching media file section or text identifiers for text media files.

12. The computer program product of claim 7, wherein the link in the link package is a uniform resource locator (URL) to the media file.

13. A computer system for optimizing storage of media files on a device, the computer system comprising:
one or more computer processors;
one or more non-transitory computer readable storage media; and
program instructions stored on the one or more non-transitory computer readable storage media and executed by the one or more processors, the program instructions comprising:
program instructions to identify a media file stored on or being stored to local device storage associated with a user;
program instructions to extract metadata from the media file;
program instructions to search storage locations associated with the user for a matching media file based on the metadata;
program instructions to determine if the matching media file was located;
responsive to the matching media file being located, program instructions to execute actions comprising:
program instructions to predict, using artificial intelligence (AI), if the local device storage should be optimized for the media file based on the matching media file; and
responsive to predicting the local device storage should be optimized, program instructions to execute actions comprising:
program instructions to create a link package comprising a link to the matching media file;
program instructions to store the link package on the local device storage; and
program instructions to remove the media file from the local device storage; and
responsive to the matching media file not being located, program instructions to execute actions comprising:
program instructions to search alternative storage locations associated with the user;
program instructions to determine if an alternative storage location was located;
responsive to the alternative storage location being located, program instructions to predict, using AI, if the local device storage should be optimized for the media file based on the alternative storage location; and
responsive to predicting the local device storage should be optimized, program instructions to execute actions comprising:
program instructions to store the media file on the alternative storage location;
program instructions to create a link package comprising a link to the media file on the alternative storage location;
program instructions to store the link package on the local device storage; and
program instructions to remove the media file from the local device storage.

14. The computer system of claim 13, wherein the metadata comprises a name of the media file, a context of the media file receipt and a media file access time window and wherein the link in the package is a uniform resource locator (URL) to the media file.

15. The computer system of claim 13, wherein determining if the local device storage should be optimized for the media file, based on the matching media, is based on factors comprising predicting a date after which the media file will not be used by the user, predicting a date until which the matching media file will not be removed and predicting importance of the media file to the user.

16. The computer system of claim 13, wherein determining if the local device storage should be optimized for the media file, based on the alternative storage location, is based on factors comprising predicting a date after which the media file will not be used by the user, predicting a date until which the alternative storage location will have the required space and predicting importance of the media file to the user.

17. The computer system of claim 13, wherein the link package, further comprises a matching media file start time and end time for audio or video in the media file, matching media file frame identifiers for images in the media file, and matching media file section or text identifiers for text media files.

\* \* \* \* \*